Oct. 5, 1954   G. M. KRIEGBAUM ET AL   2,690,860
FERTILIZER DISTRIBUTOR
Filed Oct. 18, 1951   2 Sheets-Sheet 2

Inventors:
George M. Kriegbaum
Clarence C. Haas
By: Paul O. Pippel
Attorney.

Patented Oct. 5, 1954

2,690,860

UNITED STATES PATENT OFFICE 2,690,860

FERTILIZER DISTRIBUTOR

George M. Kriegbaum, Homewood, Ill., and Clarence C. Haas, Richmond, Ind., assignors to International Harvester Company, a corporation of New Jersey Application October 18, 1951, Serial No. 252,174

8 Claims. (Cl. 222—283)

This invention relates to agricultural implements and particularly to fertilizer distributors and the like.

An object of the invention is the provision of an improved fertilizer distributor for use with potato planters and the like.

Another object of the invention is the provision of a fertilizer distributor having improved means for regulating the flow of fertilizer from the hopper to the ground.

A further object of the invention is the provision of means for dispensing fertilizer from an opening in the hopper with a minimum of resistance to the passage thereof through the fertilizer outlet.

Figure 1:
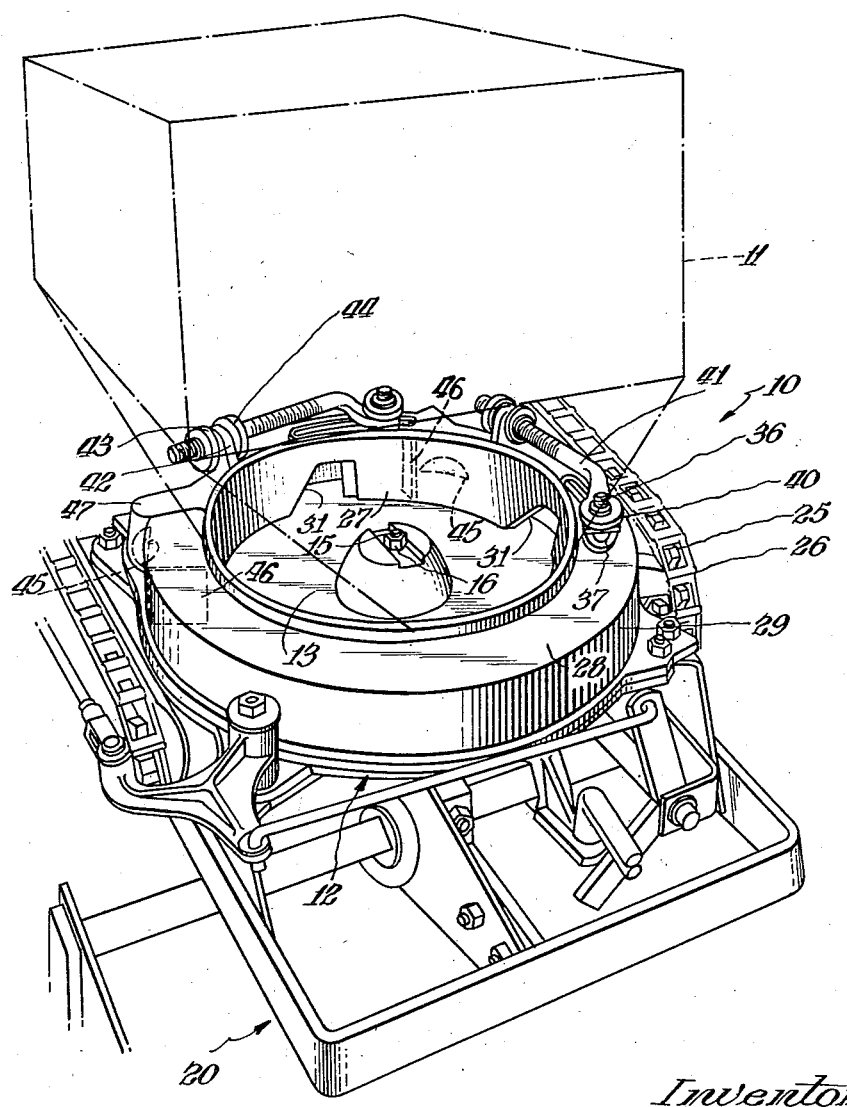
Figure 2:
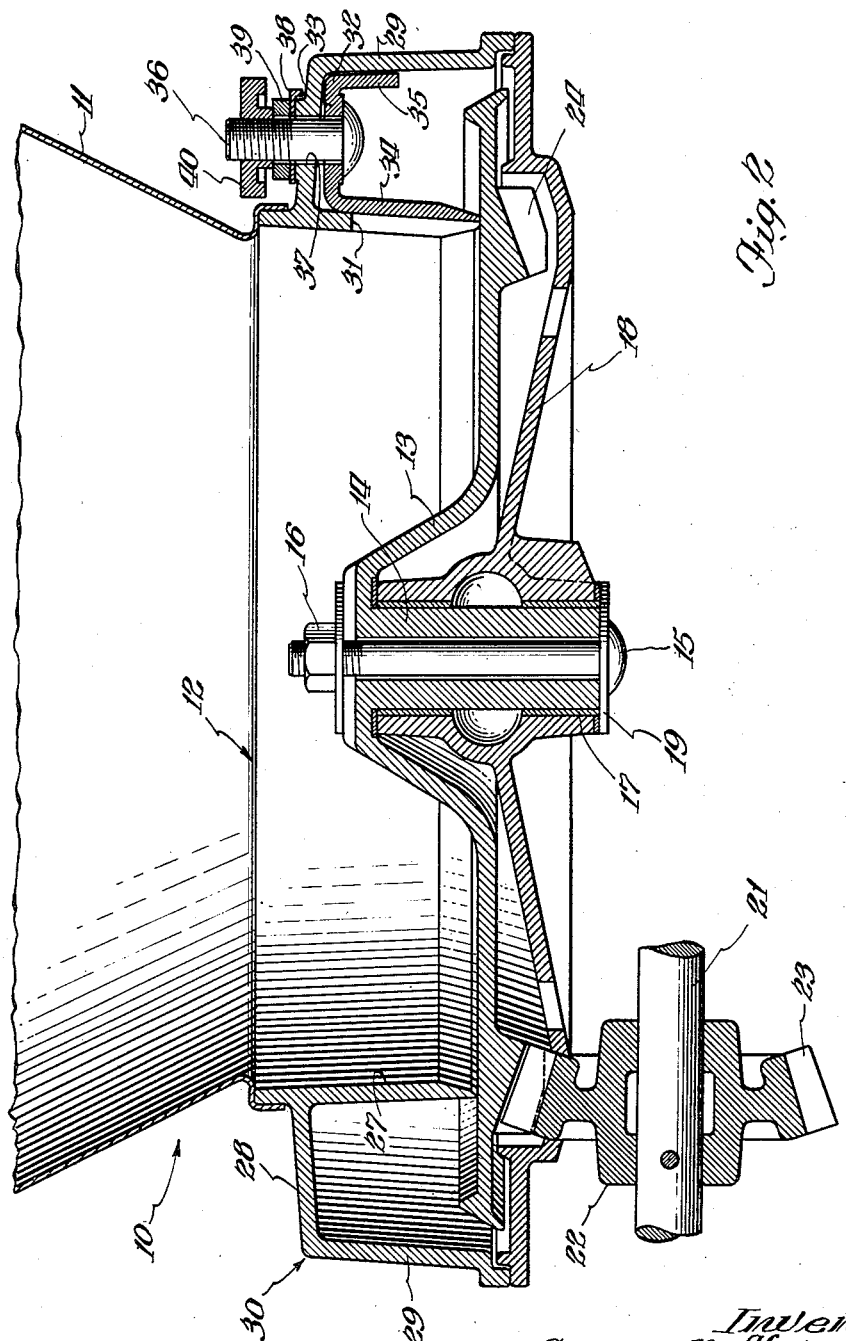

Other objects and advantages of the invention will become clear from the following detailed description when read in conjunction with the accompanying drawings, wherein:

Figure 1 is a view in perspective of the lower part of a fertilizer distributor, the main body of the receptacle being shown in dotted lines; and Figure 2 is an enlarged sectional view of a portion of the construction shown in Figure 1.

Referring to the drawings, there is shown in Figure 1 a fertilizer distributor generally designated by the numeral 10 and including a hopper 11 and a base portion 12. Fertilizer from the hopper 11 rests upon a rotatable base plate 13 having a hub portion 14 with a central bore to receive a spindle in the form of a bolt 15 threaded at one end to receive a nut 16.

The hub portion 14 is rotatable in the bearing 17 forming part of a bottom plate 18 and held in place by a collar 19 and the bolt 15. The entire distributing unit is mounted upon a conventional frame designated at 20 which further supports driving mechanism for operating the rotatable plate 13. The plate 13 is driven through suitable shafting and gearing, the drive shaft being designated by the numeral 21 and a gear thereon by the numeral 22. Gear 22 has teeth thereon 23 adapted to mesh with teeth 24 arranged annularly about the periphery of rotatable plate 13. Shaft 21 is driven through one or more sprocket wheels 25 operated by a chain 26 driven from a suitable source of power, not shown.

The base 12 of the fertilizer distributor comprises an inner cylindrical wall portion 27 connected by a substantially horizontal top portion 28 with an exterior cylindrical wall portion 29. The walls 27 and 29 and the top 28 therebetween form a peripheral tunnel, U-shaped in cross-section, around the outside of the receptacle. This tunnel is designated by the numeral 30 and extends flange-like outwardly from the base of the receptacle straddling the outer peripheral portion of the rotatable plate 13 which with the bottom plate 18 forms the base of the hopper 11 as well as of the tunnel 30.

Fertilizer within the hopper 11 and resting upon the rotatable plate 13 brushes against the interior wall 27 and passes outwardly through one or more openings 31 circumferentially formed therein. The flow of fertilizer through the openings 31 from the container or hopper 11 is free and unimpeded since there is nothing in the path of the fertilizer to hinder its progress as the plate 13 rotates and the fertilizer bears against the smooth interior of the cylindrical wall 27 at the base of the hopper. The flow of fertilizer through these openings is therefore uniform and the amount is determined by the size of the opening.

The size of the openings 31, and therefore the amount of fertilizer to be discharged from the hopper is regulated by gate mechanism now to be described. A channel-shaped member 32 is fitted within the tunnel 30 and conforms generally to the shape of the interior thereof. This U-shaped member has a transverse portion 33 and a pair of arms 34 and 35. Arm 35 bears against the outer wall 29 of the hopper base, and arm 34 is elongated and functions as a gate to cover the opening 31. Only one of these gate or channel members 32 is described although it may be understood that two are provided in the construction shown in the drawing. The channel member 32 is concentric with the tunnel 30 and the flanges or arms 34 and 35 bear closely against their respective tunnel walls 27 and 29. The arm or flange 34 of the channel member 32, as pointed out before, serves as a gate and may be adjusted circumferentially to increase or decrease the size of the opening 31 by mechanism comprising a bolt 36, the lower end of which is anchored to the transverse portion 33 of the channel member 32 and extends vertically upwardly through a concentric slot 37 formed in the top 28 of the tunnel 30. Therefore, by moving the bolt 36 in the slot, the gate or channel member 32 is moved circumferentially with respect to the inner wall 27 of the base portion 12 and exposes more or less of the opening 31 providing communication between the interior of the hopper and the tunnel 30. Since the edge of opening 31 away from the gate 32 slants and the leading edge of the gate is vertical, the shape of the opening becomes a triangle of decreasing size as the gate advances to closing position. A washer 38, a collar 39, and a nut 40 threaded for reception on the threaded end of the bolt 36 secure the gate member 32 in position in the slot 37.

Selective adjustment of the gate or channel member 32 with respect to the opening 31 is made by a threaded rod 41, one end of which is flattened out to form the collar 39 upon the bolt 36 and the other end of which is loosely received in an over-size aperture, not shown, formed in a lug 42 secured to and extending from the top 28 of the tunnel 30, and a pair of nuts 43 and 44 are provided at opposite sides of the lug 42 to hold the gate 32 in its circumferentially adjusted position.

Since the rotatable bottom plate 13 also forms the bottom of the tunnel 30, the fertilizer passing into the tunnel travels thereabout. Fertilizer is discharged through a plurality of openings 45 formed in the hopper bottom 18 and is directed thereto by a diverter in the form of a wall 46 made a part of the tunnel and substantially blocking it off to the passage of fertilizer. An enlargement 47 in the outer wall 29, two of which are provided, accommodate the diversion of fertilizer from the plate 13 to the openings 45, from which the fertilizer is directed through suitable guiding funnels, not shown, to the ground.

With circumferential openings 31 in the inner wall 27 of the hopper base and with the circumferentially-shaped gate portion 34 of the channel member 32 conforming to the cylindrical shape of the wall 27 and bearing against the outer surface thereof, it should be clear that the flow of fertilizer from the hopper to the tunnel and from the tunnel through the openings 45 to the earth penetrating tools will be uniform and unimpeded and the quantity of fertilizer passing through the openings 31 will be determined by the position of the gate 34 with respect thereto.

Having described the invention it should be understood that modifications may be made in the invention without departing from the spirit or the scope of the appended claims.

What is claimed is:

1. In a distributor for fertilizer, a hopper having an enlarged flange portion at its base including a top and a substantially cylindrical outer wall, a substantially cylindrical inner wall spaced radially from the said outer wall to define a peripheral tunnel open at the bottom, a rotatable plate at the base of the hopper forming the bottom thereof and of said tunnel, said inner wall having a circumferential opening formed therein adjacent said bottom plate to accommodate passage of fertilizer from the interior of the hopper to said tunnel, an arcuate gate concentric with the outer surface of said inner wall arranged to cover said opening, an adjusting member connected to said gate and extending through the top of said tunnel portion to move said gate circumferentially with respect to said opening to vary the amount of fertilizer discharged to the tunnel, and the bottom of said tunnel having an opening formed therein for discharging fertilizer therefrom.

2. In a distributor for fertilizer, a hopper having an enlarged flange portion at its base including a top and a substantially cylindrical outer wall, a substantially cylindrical inner wall spaced radially from the said outer wall to define a peripheral tunnel open at the bottom, a rotatable plate at the base of the hopper forming the bottom thereof and of said tunnel, said inner wall having a circumferential opening formed therein adjacent said bottom plate to accommodate passage of fertilizer from the interior of the hopper to said tunnel, an arcuate gate concentric with the outer surface of said inner wall arranged to cover said opening, the top of said tunnel having a circumferential slot formed therein, an adjusting member mounted on said tunnel top, said member having a part extending through said slot and connected to said gate, means for circumferentially adjusting said part in the slot to vary the position of the gate, and the bottom of the tunnel having an opening formed therein for discharging the fertilizer therefrom.

3. In a distributor for fertilizer, a hopper having an enlarged flange portion at its base including a top and a substantially cylindrical outer wall, a substantially cylindrical inner wall spaced radially from the said outer wall to define a peripheral tunnel open at the bottom, a rotatable plate at the base of the hopper forming the bottom thereof and of said tunnel, said inner wall having a circumferential opening formed therein adjacent said bottom plate to accommodate passage of fertilizer from the interior of the hopper to said tunnel, an arcuate gate concentric with the outer surface of said inner wall arranged to cover said opening, the top of said tunnel having a circumferential slot formed therein, an adjusting member mounted on said tunnel top, said member comprising a threaded bolt, means pivotally and adjustably connecting one end of said bolt to the tunnel top for circumferential adjustment of the bolt, a circumferential slot formed in said tunnel top, a part carried by said bolt and receivable in the slot, a connection between said part and said gate, and the bottom of the tunnel having a discharge outlet formed therein.

4. In a distributor for fertilizer, a receptacle having a substantially cylindrical lower wall portion, a concentric wall spaced outwardly from said inner wall portion and connected thereto by a substantially horizontal top portion to form a peripheral tunnel around the lower portion of the receptacle, a rotatable plate forming the bottom of the receptacle and of the tunnel, said lower inner wall portion having a circumferential opening formed therein to accommodate passage of fertilizer from the interior of the receptacle to the tunnel, the bottom of the tunnel having an opening communicating therewith for discharging fertilizer to the outside, and means for adjusting the size of the opening in said wall portion comprising a channel member engaging the inner surface of the walls and top of the tunnel, the inner flange of said channel member being concentric with the said inner wall and circumferentially adjustable to cover part or all of the opening therein, and a member circumferentially movable to selected positions secured to said channel member and extending through the walls of said tunnel.

5. In a distributor for fertilizer, a receptacle, an annular tunnel surrounding the lower portion of the receptacle having fixed side walls and top, a rotatable base plate covering the bottom of the receptacle and the tunnel, the inner wall of said tunnel having an opening formed therein providing communication between the receptacle portion and the tunnel for the passage of fertilizer to the tunnel during rotation of the base plate, a channel member conforming to the shape of the interior of the tunnel and having a concentric portion serving as a gate covering the opening to the receptacle portion, said channel member being circumferentially adjustable to vary the amount of fertilizer discharged to the tunnel, an adjusting member carried by the tunnel portion exteriorly thereof, said adjusting member being circumferentially adjustable to selected positions, and a connection between the adjustable member and the channel member.

6. In a distributor for fertilizer, a receptacle, an annular tunnel surrounding the lower portion of the receptacle having fixed side walls and top, a rotatable base plate covering the bottom of the receptacle and the tunnel, the inner wall of said tunnel having an opening formed therein providing communication between the receptacle portion and the tunnel for the passage of fertilizer to the tunnel during rotation of the base plate, a channel member conforming to the shape of the interior of the tunnel and having a concentric portion serving as a gate covering the opening to the receptacle portion, said channel member being circumferentially adjustable to vary the amount of fertilizer discharged to the tunnel, an adjusting member carried by the tunnel portion exteriorly thereof, said adjusting member being circumferentially adjustable to selected positions, said tunnel wall having an arcuate slot concentrically formed therein, means extending through said slot connecting said adjustable member to said channel member for adjusting the latter, said tunnel having an outlet formed therein for discharging fertilizer therefrom.

7. In a distributor for fertilizer including a hopper having an opening in the top, a bottom plate, and a lower cylindrical inner wall, an outer wall spaced radially from the inner wall and a transverse top portion forming with said bottom an annular tunnel surrounding the base of the hopper, a rotatable base plate upon which the fertilizer rests having its outer portion extending into the tunnel with its periphery spaced from said outer wall to provide communication with the hopper bottom, said inner wall having a circumferential opening formed therein to accommodate passage of fertilizer from the interior of the hopper into said tunnel, and said bottom plate having openings formed therein for the discharge of fertilizer received from the rotatable plate.

8. In a distributor for fertilizer including a hopper having an opening in the top and a cylindrical lower wall portion, an outer wall spaced radially from the inner wall portion and having a transverse top portion connected to the inner wall to form a peripheral tunnel around the base of the hopper, a rotatable plate at the base of the hopper forming the bottom thereof and extending radially outwardly into the tunnel, said inner wall having a circumferential opening formed therein adjacent said plate to accommodate passage of fertilizer from the interior of the hopper into said tunnel, a movable gate engageable with the outer surface of said inner wall, said gate being movable between open and closed positions with respect to said circumferential opening, and an adjusting member connected to said gate and extending through the outer wall of the tunnel, said member being operable to move the gate circumferentially with respect to said opening to vary the amount of fertilizer discharged into the tunnel through said circumferential opening.

References Cited in the file of this patent

UNITED STATES PATENTS

| Number | Name | Date |
|---|---|---|
| 217,628 | Marks et al. | July 15, 1879 |
| 888,963 | Dahlund | May 26, 1908 |
| 1,210,636 | Garst | Jan. 2, 1917 |
| 1,934,899 | White | Nov. 14, 1933 |
| 2,369,508 | White | Feb. 13, 1945 |